United States Patent
Parker

[11] 3,945,218
[45] Mar. 23, 1976

[54] ENVIRONMENT CONTROL SYSTEM

[75] Inventor: Sidney A. Parker, Fort Worth, Tex.

[73] Assignee: Lennox Industries, Inc., Marshalltown, Iowa

[22] Filed: Jan. 2, 1975

[21] Appl. No.: 538,010

[52] U.S. Cl. .................. 62/260; 165/45; 60/641
[51] Int. Cl.² ........................................ F25B 27/00
[58] Field of Search ........ 165/45; 60/690, 692, 641, 60/675; 62/119, 260

[56] References Cited
UNITED STATES PATENTS

| | | | |
|---|---|---|---|
| 1,493,368 | 5/1924 | Merz | 60/641 |
| 2,499,736 | 3/1950 | Kleen | 62/119 |

Primary Examiner—Allen M. Ostrager
Attorney, Agent, or Firm—Seymour Rothstein

[57] ABSTRACT

This invention relates to an environment control system utilizing the elevation differences and available temperatures on the earth's surface, such as occur in a mountainous region with a nearby valley or a desert. The system includes heat rejection means, as for example, a condenser located at a higher elevation (a mountain top). Means for supplying heat to the system may be provided at a lower elevation (in a valley or desert region below). A geothermal source of heat, such as a hot spring, may be used. Liquid flowing from the condenser at a relatively high pressure will be expanded, vaporized and cooled. The cooled vapor will absorb heat from the heat supply means and then be returned to the condenser on the mountain top.

The heat supply means or heat exchanger in the valley may be utilized as an evaporator to provide cooling for a buildingn, as for example, a hotel or factory. In some instances in this application, it may be necessary to supply additional heat or work to the vapor in order to assist the return of same to the mountain top.

12 Claims, 1 Drawing Figure

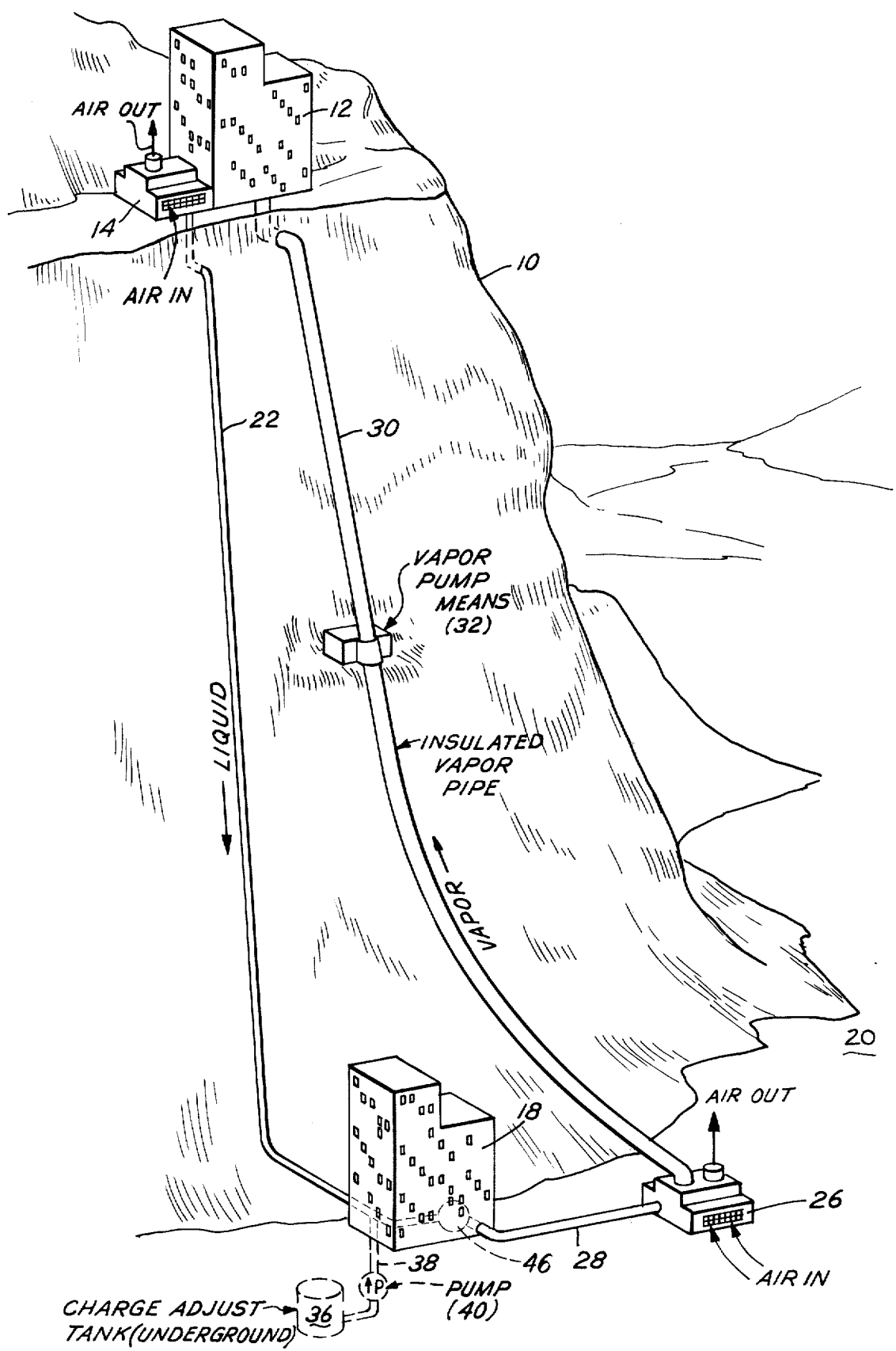

ENVIRONMENT CONTROL SYSTEM

BACKGROUND AND SUMMARY OF THE INVENTION

This invention relates to an environmental control arrangement utilizing the elevation differences and available temperatures on the earth's surface.

For some time, concern has been expressed regarding the availability of natural resources to provide the inreasing power demands for environmental control by the inhabitants of the earth. The recent oil crisis brought into focus the increasing demands for power in our country and elsewhere and the necessity for conservation of existing fuel supplies and tapping of new sources for fuel and power. In considering the various means of generating power or taking advantage of natural phenomena it occurred to me that effective use could be made of the earth's topgraphy and that an efficient environment control system could be provided that utilized the elevation differences on the earth's surface and the available temperature potentials on the earth's surface. A number of regions in the United States and elsewhere in the world have relatively high mountains which are relatively cool at the top and nearby relatively low valleys which are relatively warm. These regions have tremendous potential energy that can be tapped to provide an efficient environmental control system.

An object of the present invention is to provide a novel environmental control system utilizing the elevational differences and available temperatures on the earth's surface.

Another object of the present invention is to provide an improved environmental control system that includes a first heat exchanger disposed at a relatively cool high place on the earth's surface, a second heat exchanger disposed at a relatively warm lower level on the earth's surface, refrigerant expansion means at the lower level, a relatively small diameter conduit communicating the first heat exchanger with the refrigerant expansion means, and a relatively large diameter conduit communicating the second heat exchanger with the first heat exchanger, whereby liquid flowing through the small diameter conduit will pass through the expansion means and be flashed into vapor, with heat being added at the second heat exchanger to assist in returning the vapor to the first combination heat exchanger.

Yet another object of the present invention is to provide an improved system for heating and cooling a building, as for example, a hotel or factory on the earth's surface in an efficient manner.

Other objects and advantages of the present invention will be made more apparent hereinafter.

BRIEF DESCRIPTION OF THE DRAWINGS

There is illustrated in the attached drawing a presently preferred embodiment of the present invention, wherein:

FIG. 1 is a perspective view of the present system illustrating the essential components thereof and the relationship between the components on the earth's surface.

DETAILED DESCRIPTION OF THE PREFERRED EMBODIMENT

Referring now to FIG. 1, there is illustrated an environmental control system embodying principles of the present invention. The present system is adapted to be utilized on the earth's surface in an area where there are relatively large elevation differences between the proximate points on the earth's surface, as for example, a mountain top and the valley below. It is know, for example, the Ashrae Guide and Data Book 1963, page 39, that the definition of a standard and atmosphere is $T = To - 0.003566Z$, where T is temperature in °F at some elevation Z; To is temperature in °F at sea level; and Z is elevation in feet. The practical limit for this relationship is 35,332 feet. Relating this equation to temperatures at different elevations the relationship is expressed as follows: $T_2 = T_1 - 0.003566 (Z_2 - Z_1)$; where $T_1$ is a temperature in degrees Fahrenheit at a lower elevation, as for example, at sea level; and $Z_1$ is the lower elevation in feet. $T_2$ is the temperature at the upper elevation in degrees Fahrenheit and $Z_2$ is the elevation at the upper level in feet.

One area with large available heat and elevation differences would be Peru and Chile in South America where the Andes Mountain are on the order of Twenty-thousand (20,000) feet high, thus providing a substantial elevation difference. Here, there are relatively cool temperatures in the mountains and relatively warm temperatures in the valleys or Pacific Ocean below. Many areas within the United States would similarly be suitable, as for example, the Death Valley region. Death Valley is below seal level and reaches temperatures in the daytime on the order of 135°F. Not far away is Telescope Peak, which is eleven-thousand forty-five (11,045) feet high. The elevation differences between the valley and mountain top is in excess of eleven-thousand three-hundred (11,300) feet providing a temperature difference of about 40°F. Regions such as this provide the necessary temperatures and elevational differences required for efficient operation of my improved environment control system.

Referring to FIG. 1, the mountain 10 is provided at a location proximate the top thereof with a heat exchanger or condenser 14, which is preferably of the air cooled type, so as to take advantage of the natural air currents available. It is within the scope of this invention to utilize a water-cooled condenser. A building for example a hotel, may be located adjacent the heat exchanger 14 and function to use heat discharged from the heat exchanger 14 to supplement or supply heat to the hotel. Thus, the hotel building may in effect form a part of the desired heat transfer between the fluid in the heat exchanger 14 and the surrounding environs and the building 12 and heat exchanger 14 may be regarded to be first combination heat exchanger means. The condenser 14 provides heat rejection means when the building 12 is not used in the system. With sufficient heat transfer capacity, several buildings may be heated by my novel system. Alternatively, the system can provide auxiliary heat in winter or when the sun sets, to reduce use of fossil fuel for heating purposes at high elevations.

A building 18 is provided in the valley 20 below along with additional heat exchanger or evaporator means 26. The building 18 and evaporator means 26 may cooperate in a fashion similar to the building 12 and condenser 14 and may be regarded as second combination heat exchanger means. Preferably, there is a maximum elevation difference between the lower level building 18 and evaporator means 26 and the building 12 and the condenser 14. Heat exchanger 14 is connected by conduit 22 to building 18 which functions with evaporator 26 to supply heat to the fluid in the system. Building 18 is connected to evaporation means 26 by conduit 28.

Liquid entering the building 18 will be expanded through expansion means, for example, a thermal expansion valve and the liquid will be cooled and vaporized providing cooling means for building 18. Heat drawn from building 18 will warm the vapor. The vapor will flow through conduit 28 to heat exchanger 26, which is provided in the valley 20, at as low an elevation as possible relative to the mountain top. Heat exchanger 26 will draw relatively warm air from the valley 20 and thereby further heat the vapor received from the building 18 via the conduit 28. Heat exchanger 26 functions as heat supply means for the system. The heat exchanger 26 may use air to heat fluid flowing from conduit 28 or the heat exchanger 26 may be connected to a geothermal source, for example, a hot spring, in order to draw heat from within the earth. Alternatively, heat may be obtained from a large body of water such as a lake or ocean. The concept is to heat the vapor in the system and in so doing cool the air in the region about the heat exchanger 26 or cool the large body of water, thus providing cooler air or water that might be used for environmental cooling.

Vapor is returned from the heat exchanger 26 to the combination heat exchanger means 12, 14 through the relatively large diameter insulated pipe 30. Vapor pump means 32 may be provided at a point intermediate to the heat exchanger 26 and the combination heat exchanger means 12, 14 to assist return of the vaporous fluid from the heat exchanger 26 to the combination heat exchanger 12, 14.

A charge adjustment tank 36 may be provided in the valley 20 and operatively connected to the conduit 22 by means of a conduit 38. A pump means 40 is provided in the conduit 38 in order to control the flow of fluid from the charge adjust tank to the system and vice versa. Conduit 38 is connected upstream of expansion means. The charge adjustment tank 36, conduit 38 and pump 40 provide charge adjustment means for the system.

Turning now to a consideration of the operation of the system, it is noted that different types of fluid may be utilized. The fluid will have a vapor form at one temperature and pressure and a liquid form at another temperature and pressure.

Assuming that the fluid is R-12 and that there is an elevation difference between the mountain top and the valley below of eleven-thousand three-hundred twenty-six (11,326) feet, as there would be between the bottom of Death Valley and the top of Telescope Peak, for every 1.8 feet of elevation in a R-12 column there would be one pound per square inch of pressure. Therefore, eleven-thousand three-hundred twenty-sic (11.326) feet divided by 1.8 equals six-thousand two-hundred ninety-two (6,292) pounds per square inch of pressure at the bottom of conduit 22 which connects heat exchanger 14 with the building 18. Within the building 18 is provided a thermally responsive expansion means 46. The R-12 in liquid form, passing through the relatively small diameter conduit 22, passes into the expansion means and heat exchanger which cools the lower level structure. The liquid or vapor or liquid vapor combination from the building 18 will pass through the conduit 28 and further be flashed into vapor in heat exchanger 26. The vapor will then return to the building 12 in the relatively large diameter pipe 30 and then to condenser 14. The atmosphere on the mountain top, which is relatively cool, will cool and condense the vapor into R-12 droplets which will pass into the liquid line 22 and return to the valley below. Liquid line 22 is not insulated when it is desired to supply heating to hotel or building 12 but it is preferably insulated if cooling is to be supplied to a building 18.

The pipe 30 is insulated so as to prevent R-12 vapor from condensing into R-12 droplets and falling back down into the heat exchanger 26 in valley 20 and adversely affecting operation of the system.

In one form of the invention, the pipe 22 will be on the order of 1 to 2 inches in inner diameter and the pipe 30 will be on the order of 12 to 18 inches in inner diameter.

Considering the operation further, it is noted that there was six-thousand two-hundred ninety-two (6,292) pounds per square inch of pressure to be expanded in the building 18.

The cooling is determined by the flow rate per unit of time and mainly the pressure drop of the vapor line and the sizes of the heat exchangers in the environment control system. With a forty-five thousand six-hundred twenty-seven (45,627) lbs. per hour flowing through the expansion valve there would be 200 tons of refrigeration or 2,400,000 BTU per hour. If the flow rate were four-hundred fifty-six thousand two-hundred seventy (456,270) lbs. per hour, there would be 2,000 tons of refrigeration. It is seen from these figures that substantial amounts of cooling will result from operation of the system of the present invention.

Though the cycle of operation has been described utilizing R-12 as the refrigerant, it is apparent that other refrigerants may be utilized in place of R-12, as for example, R-113, butane, propane, or carbon dioxide.

Sample calculations for the amount of available cooling considering Pikes Peak are very impressive in terms of cooling potential. Pikes Peak is 14,110 feet high and the foot of the mountain is Colorado Springs is at an elevation of 5,000 feet. Thus, there is a differential height of 9,110 feet. An average temperature differential on the order of 32.5°F exists. Dividing the height differential by 1.8 feet results in 5,061 pounds per square inch of pressure at the 5,000 foot elevation.

The cooling generated if 59 pounds of R-12 is flowing per second through building 18 is 12,000,000 BTU per hour or 1,000 tons of refrigeration. This calculation is based on a flow rate of 59 pounds of R-12 per second and would be increased in direct proportion to the increase in flow rate.

If the fluid utilized in the system is R-113, then depending on the height differential there would ordinarily be sufficient heat picked up by the heat exchanger 26 to return the vapor to the first heat exchanger means 12, 14 (or to condenser 14 in the event there is no building 12 on the mountain. However, if insufficient flow is encountered, vapor pump means may be employed.

It is sometimes necessary to adjust the charge in the system to accommodate changes in seasons, as well as the wide temperature fluctuations of a hot warm day and a cool night. This may be accomplished by means of the charge adjust tank 36 and pump means 40 which communicates to the liquid line 22. (The charge adjustment means comprising tank 36 and pump 40 will adjust the charge in the system to optimize operation depending upon heat radiation as occurs through daily, seasonal and/or geothermal change.)

Another part of the invention is that the structure at the mountain top can be heated with the warm vapor coming from the valley 20 below. Using the same example of Pikes Peak where some 1,000 tons of cooling was available at the lower level, there will likewise be approximately 1,000 tons of heat for heating the structure at the mountain top assuming no losses. Heat exchanger 26 may be a grid of pipes laid on dry desert land and black asphalt laid over and in thermal contact with the pipes.

There has been provided by the present invention an improved system for cooling and heating utilizing the elevation differences and available temperatures on the earth's surface. As evidenced from the calculations presented above, tremendous cooling or heating potential is available utilizing applicant's system with relatively little power input required and hence, little use of fossil fuels. It is seen that the heat exchangers at the lower level in the applicant's system utilize the available heat from the structures in the valley or the heat from a geothermal source. It is contemplated that solar heat could be used in this combination.

The potential of the applicant's heating and cooling arrangement is very broad in terms of desirable topographical locations. In the United States, some typical sites have desirabley elevation and temperature differentials are Mt. Shasta, Mt. McKinley, and Mt. Ranier.

While there has been disclosed a presently preferred embodiment of the invention, it will be understood that the invention is not limited thereto since it may be otherwise embodied within the scope of the following claims.

I claim:

1. An environment control system utilizing the elevation difference between a higher elevation and a lower elevation and available temperatures on the earth's surface comprising heat rejection means at a higher elevation, heat supply means at a lower elevation, refrigerant expansion means at substantially the same level as the heat supply means, relatively small diameter conduit means communicating the heat rejection means and the refrigerant expansion means and the heat supply means respectively, relatively large diameter insulated conduit means communicating the heat supply means with the heat rejection means, the elevation difference creating a pressure head of liquid refrigerant in said small diameter conduit means and charge adjustment means for controlling flow of fluid to or from the system to optimize operation depending on said charge adjustment means including pump means, whereby liquid refrigerant flowing through the relatively small diameter conduit means is expanded through said expansion means and vaporized and cooled and the cool vaporized refrigerant will absorb heat from the heat supply means and flow to the heat rejection means.

2. An environment control system as in claim 1 including vapor pump means in the relatively large diameter conduit means for helping vaporized fluid to be returned to the heat rejection means.

3. An environment control system as in claim 1 wherein the heat supply means comprises a heat exchanger.

4. An environment control system as in claim 2 wherein the heat supply means comprises a heat exchanger.

5. An environment control system as in claim 2 wherein the small diameter conduit means is insulated.

6. An environment control system as in claim 5 wherein the heat supply means comprises a heat exchanger.

7. An environment control system as in claim 1 wherein a chamber to be cooled is disposed at the lower elevation, with the interior thereof in heat exchange relationship with the relatively small diameter conduit means and the relatively small diameter conduit means is insulated.

8. An environment control system as in claim 7 wherein the heat supply means to the system comprises a heat exchanger.

9. An environment control system as in claim 1 wherein a chamber to be heated is disposed at the higher elevation in heat transfer relationship with the heat rejection means for receiving heat discharged therefrom.

10. An environment control system as in claim 9 wherein the heat rejection means includes a heat exchanger.

11. An environment control system as in claim 1 wherein the refrigerant is from the group comprising water, a fluorinated hydrocarbon, butane, propane, or carbon dioxide.

12. An environment control system as in claim 1 wherein the charge adjustment means is connected to the system between the refrigerant expansion means and the heat rejection means at said higher elevation.

* * * * *

UNITED STATES PATENT OFFICE
CERTIFICATE OF CORRECTION

PATENT NO. : 3,945,218
DATED : March 23, 1976
INVENTOR(S) : Sidney A. Parker

It is certified that error appears in the above-identified patent and that said Letters Patent are hereby corrected as shown below:

In the Abstract, line 17, change "buildingn" to --building--.

Column 1, line 12, change "inreasing" to --increasing--; and line 20, change "topgraphy" to --topography--.

Column 2, line 10, change "know" to --known--;

line 11, underscore "Ashrae Guide and Data Book 1963";

line 26, change "Mountain" to --Mountains--;

line 33, change "seal" to --sea--; and line 48, insert a comma after "building".

Column 3, line 60, change "twenty-sic" to --twenty-six--; and line 61, change "11.326" to --11,326--.

Column 4, line 46, insert "which" after --Springs--; and line 63, change "mountain" to --mountain)--.

Column 5, line 33, change "have desirabley" to --having desirable--; and line 34, change "Ranier" to --Rainier--.

Signed and Sealed this

Twenty-seventh Day of July 1976

[SEAL]

Attest:

RUTH C. MASON
Attesting Officer

C. MARSHALL DANN
Commissioner of Patents and Trademarks